US010138813B2

(12) United States Patent
Andersson et al.

(10) Patent No.: US 10,138,813 B2
(45) Date of Patent: Nov. 27, 2018

(54) OIL BEARING WITH DRAIN SYSTEM, GAS TURBINE COMPRISING SUCH AN OIL BEARING

(71) Applicant: Siemens Aktiengesellschaft, Munich (DE)

(72) Inventors: Thomas Andersson, Linkoping (SE); Nigel Burns, Craigavon (IE); Mikael Frejd, Norrkoping (SE)

(73) Assignee: Siemens Aktiengesellschaft, Munich (DE)

( * ) Notice: Subject to any disclaimer, the term of this patent is extended or adjusted under 35 U.S.C. 154(b) by 238 days.

(21) Appl. No.: 14/904,989

(22) PCT Filed: Jul. 7, 2014

(86) PCT No.: PCT/EP2014/064418
§ 371 (c)(1),
(2) Date: Jan. 14, 2016

(87) PCT Pub. No.: WO2015/043788
PCT Pub. Date: Apr. 2, 2015

(65) Prior Publication Data
US 2016/0195016 A1  Jul. 7, 2016

(30) Foreign Application Priority Data

Sep. 30, 2013 (EP) .................................. 13186643

(51) Int. Cl.
*F01D 25/16* (2006.01)
*F02C 7/06* (2006.01)
(Continued)

(52) U.S. Cl.
CPC ............... *F02C 7/06* (2013.01); *F01D 25/16* (2013.01); *F01D 25/18* (2013.01); *F02C 7/20* (2013.01);
(Continued)

(58) Field of Classification Search
None
See application file for complete search history.

(56) References Cited

U.S. PATENT DOCUMENTS 4,741,630 A  *  5/1988  Oeynhausen ........... F01D 11/00
                                                          384/144
5,494,355 A       2/1996  Haase
(Continued)

FOREIGN PATENT DOCUMENTS

CN  1085301 A   4/1994
CN  1379184 A   11/2002
(Continued)

OTHER PUBLICATIONS

CN Office Action dated Mar. 1, 2017, for CN patent application No. 201480041049.X.

*Primary Examiner* — Igor Kershteyn
*Assistant Examiner* — Theodore Ribadeneyra
(74) *Attorney, Agent, or Firm* — Beusse Wolter Sanks & Maire

(57) ABSTRACT

An oil bearing to support a rotor of a turbine, especially of a gas turbine, wherein the rotor extends along a rotor axis coinciding with a bearing axis, has at least one oil bearing pad being lubricated by oil, including an oil sump suitable and located to collect the oil from the bearing pads by forces of gravity, including a drain system of the oil sump to conduct the oil away from the oil sump. The drain system includes at least three drain openings of the oil sump, wherein a first drain opening joining a first drain line is located between 4 o'clock and 5 o'clock according to the bearing axis, wherein a second drain opening joining a second drain line is located between 5:30 and 6:30, wherein a third drain opening joining a third drain line is located between 7 o'clock and 8 o'clock.

6 Claims, 2 Drawing Sheets

(51) Int. Cl.
*F01D 25/18* (2006.01)
*F16C 33/10* (2006.01)
*F02C 7/20* (2006.01)

(52) U.S. Cl.
CPC ...... *F16C 33/1045* (2013.01); *F16C 2360/23* (2013.01)

(56) References Cited

U.S. PATENT DOCUMENTS

| | | | |
|---|---|---|---|
| 9,341,117 B2 * | 5/2016 | Remer | F02C 7/06 |
| 2002/0141862 A1 | 10/2002 | McEwen | |
| 2003/0138319 A1 | 7/2003 | Frosini | |
| 2004/0037696 A1 * | 2/2004 | Frosini | F01D 25/16 |
| | | | 415/112 |
| 2010/0054927 A1 | 3/2010 | Almstedt et al. | |
| 2013/0028718 A1 * | 1/2013 | Strom | F01D 9/065 |
| | | | 415/182.1 |
| 2013/0343929 A1 * | 12/2013 | Tombers | F01D 25/18 |
| | | | 417/406 |
| 2014/0147258 A1 * | 5/2014 | Lohse | F01D 25/16 |
| | | | 415/175 |

FOREIGN PATENT DOCUMENTS

| | | |
|---|---|---|
| CN | 101321929 A | 12/2008 |
| EP | 0649507 A1 | 4/1995 |
| EP | 1255024 A3 | 3/2009 |
| IT | 1319409 B1 | 10/2003 |
| JP | 2001200847 A | 7/2001 |
| WO | 0202913 A1 | 1/2002 |
| WO | 2013004451 A1 | 1/2013 |

* cited by examiner

OIL BEARING WITH DRAIN SYSTEM, GAS TURBINE COMPRISING SUCH AN OIL BEARING

CROSS REFERENCE TO RELATED APPLICATIONS

This application is the US National Stage of International Application No. PCT/EP2014/064418 filed Jul. 7, 2014, and claims the benefit thereof. The International application claims the benefit of European Application No. EP13186643 filed Sep. 30, 2013. All of the applications are incorporated by reference herein in their entirety.

FIELD OF INVENTION

The invention relates to an oil bearing to support an axial rotor of a turbine especially a gas turbine rotor comprising at least one oil bearing pad being lubricated by oil, further comprising an oil sump suitable and located to collect said oil from said bearing pads by forces of gravity, further comprising a drain system of said oil sump to conduct said oil away from said oil sump.

BACKGROUND OF INVENTION

Oil bearings or hydraulic bearings especially for a stationary gas turbine are known from WO 02/02913 A1. WO 02/02913 A1 deals with draining oil away from said oil bearing in a sufficient manner. This document proposes to use two drainage ports one at 5 o'clock and one at 7 o'clock according to an axial cross section of said bearing. Since forces of gravity might not be sufficient to avoid oil flooding it is further proposed to support the oil drainage by an increased pressure in the bearing casing.

Document WO 2013/004451 A1 proposes to improve the oil drainage by swirling the oil into the drain pipe and by having a gas column in the co-axial center of said drain pipe swirl which's overall flow distribution makes the oil flow quicker through said drain pipe.

While the prior art cited above deals with draining oil of strictly stationary gas turbines it is one object of the invention to safely drain said lube oil also when the bearing is tilted in any direction up to a certain degree. Such circumstances can occur on a floating vessel or ship.

In the following terms like radial, axial, tangential, circumferential refer to a central bearing axis, which here is identical to a rotor axis. A rotational movement of said bearing along said bearing axis or a parallel axis is referred to as "rolling" and a rotational movement perpendicular to said bearing axis is referred to as "pitching".

In these terms it is one object of the invention to make bearings for gas turbines suitable to be operated on a floating vessel, were static or dynamic or both rolling and/pitching movement occur. One specific design issue to be solved by the invention is to make sure that the lubrication oil will be drained off from the bearing correctly at all conditions without risk for leaking liquid to surrounding parts which potentially can damage the gas turbine or another machine and cause a potential unavailability of machines.

SUMMARY OF INVENTION

To solve the above issues an oil bearing or a gas turbine comprising said oil bearing according to the incipiently mentioned type is proposed being further characterized by said drain system comprising at least three drain openings in said sump, wherein a first drain opening joining a first drain channel is located between 4 o'clock and 5 o'clock, a second drain opening joining a second drain channel is located between 5:30 and 6:30 and a third drain opening joining a third drain channel is located between 7 o'clock and 8 o'clock.

The position definition referring to the time scale refers to the hour pointer of an analog watch applied on a axial cross section of said bearing. Since the arrangement according to the invention is in particular symmetric to a vertical plane extending along said axis in order to unambiguously define the geometry the time scale is to be applied as looking onto the watch in axial direction and positive rotation direction the bearing is designed for. The axial direction of rotation is defined by the right hand rule. The above circumferential position definition can as well be expressed in degrees of angle. If the top position is defined as being 0° the most right position is 90°, the most bottom position is 180°, the most left position is 270°, wherein 0° is identical the 360°.

An embodiment of the invention is provided by an oil bearing as claimed, wherein an oil supply pipe is let through said first and/or third drain opening to supply all said bearing pads. A benefit of using not the center drain opening to supply the oil to the bearing pad is that under most operating conditions the main drainage flow occurs through the central (which is the most bottom position) respectively second drain opening which is according to the proposed arrangement not restricted by any oil supply line.

Another embodiment provides bearing instrumental cables let through said first and/or third drain opening to connect bearing instruments to a power supply or any signal processing. This has also the benefit that the main oil drainage through the second drain opening is not restricted by any instrumentation cables.

Still another embodiment provides said oil sump and drain system being designed such that said drain system is draining said lube oil sufficiently under rotation along said axial direction at least up to 37.5° of inclination in rolling direction. In further embodiments said oils sump and said drain system are designed to cope with the draining said lube oil under a pitch angle of 12.5°.

BRIEF DESCRIPTION OF THE DRAWINGS

The above mentioned attributes and other features and advantages of this invention and the manner of attaining them will become more apparent and the invention itself will be better understood by reference to the following description of the currently best mode of carrying out the invention taken in conjunction with the accompanying drawings, wherein.

DETAILED DESCRIPTION OF INVENTION

Figure 1:
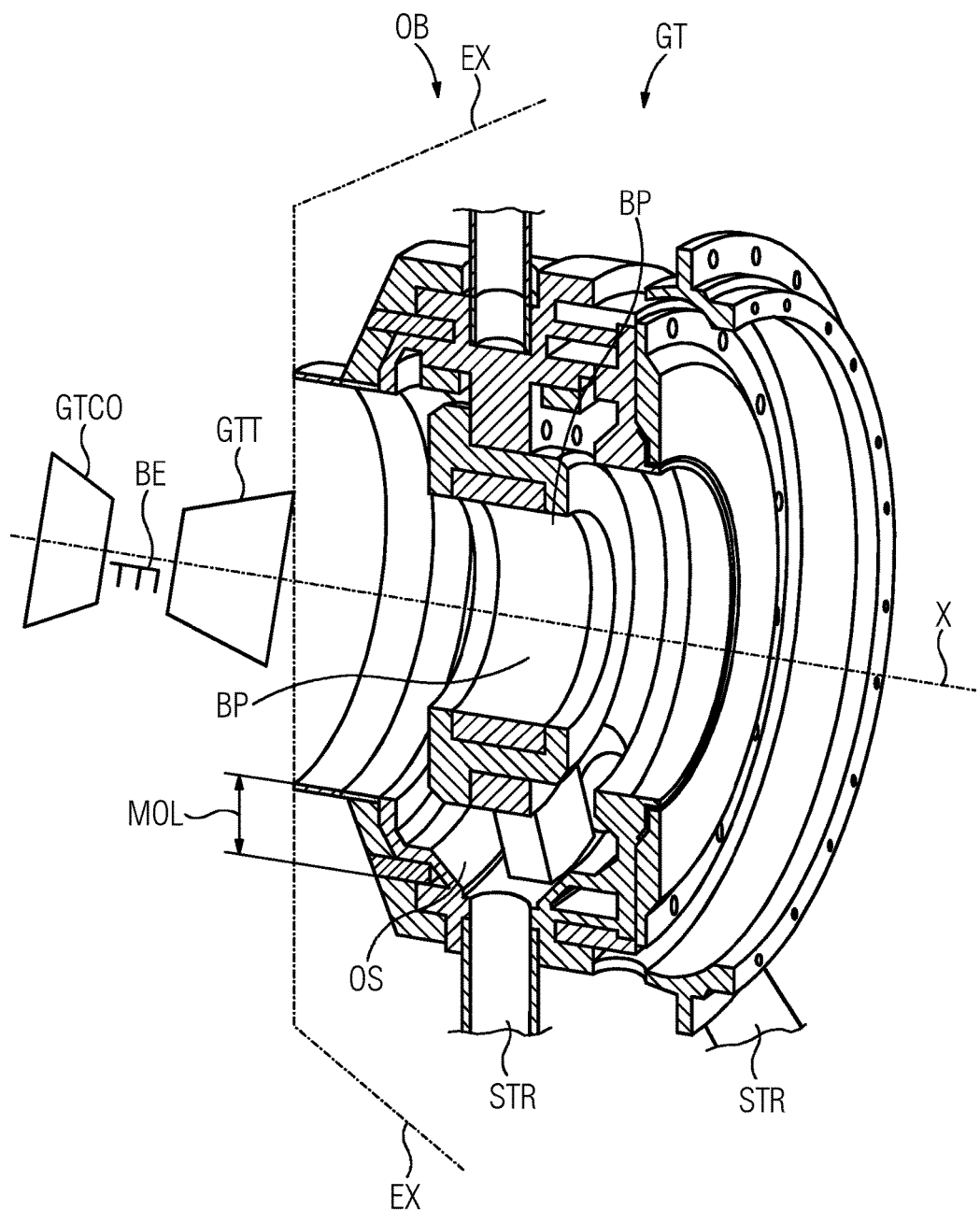
FIG. 1 shows a three dimension schematic depiction of said oil bearing according to the invention in combination with a gas turbine compressor and a gas turbine turbine both only indicated by simplified symbols.

FIG. 1 shows a schematically depiction of the three dimensional cross section in axial direction of a gas turbine oil bearing OB to support a non depicted rotor extending along an axis x. Further FIG. 1 shows symbolically a gas turbine turbine GTT and a gas turbine compressor GTCO of a gas turbine GT comprising a further bearing BE. Said gas turbine GT might comprise further components which are not depicted here.

Figure 2:
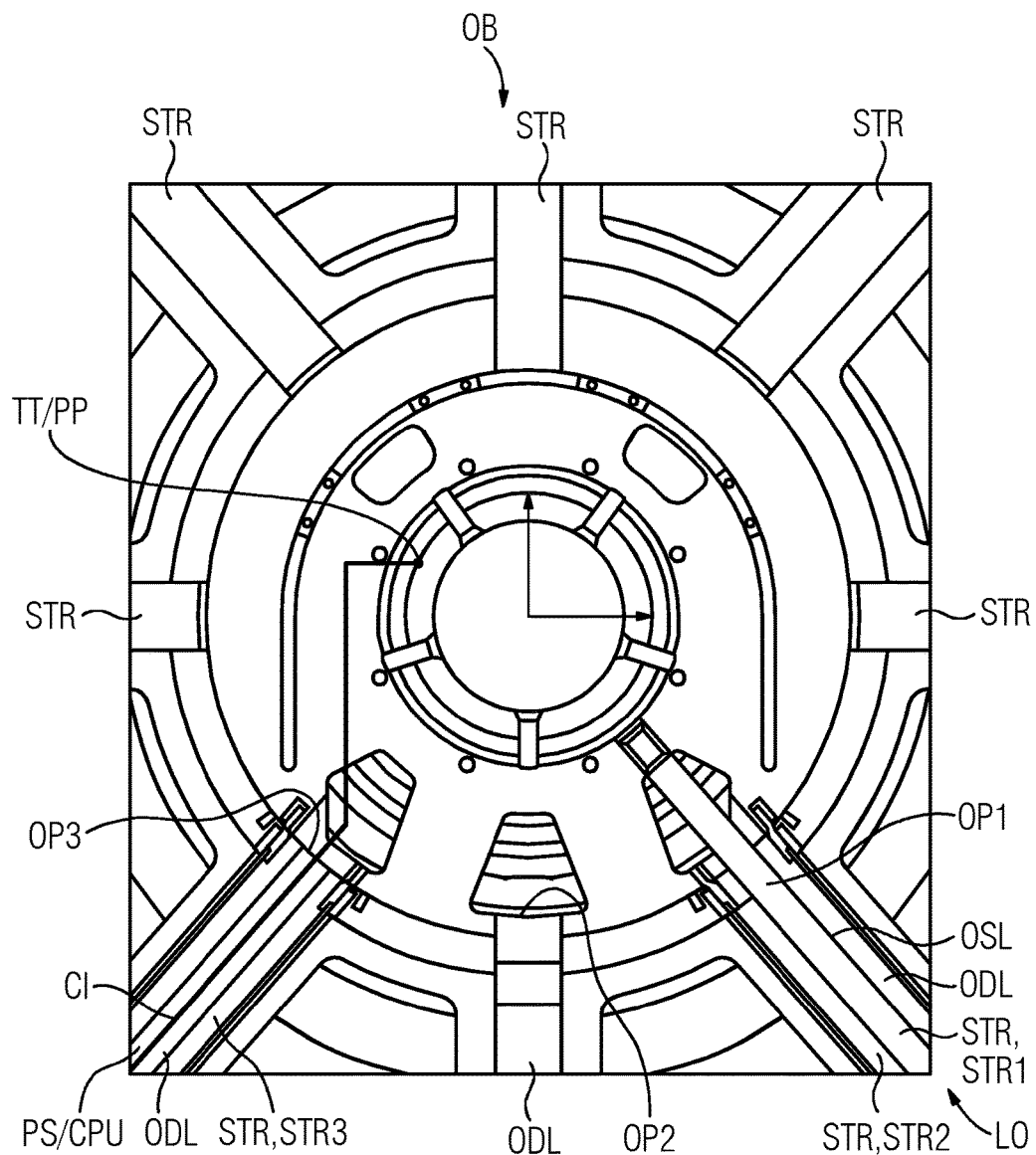
FIG. 2 shows an axial cross section of said bearing schematically.

Said oil bearing OB is located in an exhaust EX of said gas turbine turbine GTT. In order to obtain best efficiency said oil bearing OB does not restrict a free flow area cross section of said exhaust EX more than necessary to avoid extensive pressure loss. Said oil bearing is supported by radial struts STR which are integral parts of a so called central casing of the said gas turbine, which are also depicted in FIG. 2. In FIG. 2 eight radial struts are extending from said oil bearing in a star shaped manner. Oil supply lines OLS, oil drain lines ODL and instrumentation cables IC are let through said struts STR to join said oil bearing OB through a first, second and third opening OP1, OP2, OP3 into an oil sump OS of said oil bearing OB. Next to the supply function for the oil bearing the struts STR must mechanically support said oil bearing OB, which itself needs to support radially the gas turbine rotor extending along said axis X.

Bearing pads BP are supplied with lube oil LO through an oil supply line OSL of a strut STR joining a first opening OP1 into said oil sump OS in a 4:30 position according to a view of an axial cross section of said oil bearing OB. This fresh lube oil LO is warmed up in said bearing pad arrangement and driven by gravity collected by said oil sump OS to be drained through said oil drain lines ODL of said struts STR leading through said first opening OP1, second opening OP2 and third opening OP3 located at 4:30, 6:00 and 7:30 positions respectively. Even under tilting or pitching condition of said oil bearing OB said oil drain system works such that a maximum oil level MOL is never exceeded in said oil sump OS.

The invention claimed is:

1. An oil bearing (OB) to support a rotor of a turbine, wherein said rotor extends along a rotor axis coinciding with a bearing axis (x), comprising:
   at least one oil bearing pad (BP) being lubricated by oil,
   an oil sump (OS) suitable and located to collect said oil from said at least one oil bearing pad (BP) by forces of gravity,
   a drain system of said oil sump (OS) adapted to conduct said oil away from said oil sump (OS),
   wherein said drain system comprises at least three drain openings (OP1, OP2, OP3) of said oil sump (OS), comprising
   a first drain opening (OP1) joining a first drain line (ODL) located between 4 o'clock and 5 o'clock according to said bearing axis (x),
   a second drain opening (OP2) joining a second drain line (ODL) located between 5:30 and 6:30 o'clock,
   a third drain opening (OP3) joining a third drain line (ODL) located between 7 o'clock and 8 o'clock,
   wherein the clock positions refer to positions of the respective opening as seen when looking along the bearing axis with an upper-most position being a twelve o'clock position.

2. The oil bearing (OB) according to claim 1, further comprising:
   an oil supply line (OSL) let through said first drain opening and/or said third drain opening to supply said oil to said at least one oil bearing pad (BP).

3. The oil bearing (OB) according to claim 1, further comprising:
   bearing instrumentation cables let through said first and/or third drain opening (OP1, OP3) to connect bearing instrumentation to a power supply (PS) and/or a signal processing unit (CPU).

4. A gas turbine (GT) comprising:
   an oil bearing (OB) according to claim 1,
   wherein said gas turbine (GT) comprises a gas turbine exhaust (EX),
   wherein said oil bearing is located in said gas turbine exhaust (EX) and supported by at least three struts (STR), comprising
   a first strut (STR1) located at 4:30,
   a second strut (STR2) located between 5:30 and 6:30 , and
   a third strut (STR3) located between 7 o'clock and 8 o'clock,
   wherein all these struts (STR) are extending radially.

5. The oil bearing (OB) according to claim 1, wherein the turbine comprises a gas turbine.

6. An oil bearing (OB) to support a rotor of a turbine, wherein said rotor extends along a rotor axis coinciding with a bearing axis (x), comprising:
   an oil bearing pad (BP) being lubricated by oil,
   an oil sump (OS) suitable and located to collect said oil from said bearing pad (BP) by forces of gravity,
   a drain system of said oil sump (OS) adapted to conduct said oil away from said oil sump (OS), wherein said drain system comprises at least three drain openings (OP1, OP2, OP3) of said oil sump (OS), comprising:
   a first drain opening (OP1) joining a first drain line (ODL) located between 4 o'clock and 5 o'clock according to said bearing axis (x),
   a second drain opening (OP2) joining a second drain line (ODL) located between 5:30 and 6:30, and
   a third drain opening (OP3) joining a third drain line (ODL) located between 7 o'clock and 8 o'clock, and
   bearing instrumentation cables let through said first and/or third drain opening (OP1, OP3) to connect bearing instrumentation to a power supply (PS) and/or a signal processing unit (CPU),
   wherein the clock positions refer to positions of the respective opening seen when looking along the bearing axis with an upper-most position being a twelve o'clock position.

\* \* \* \* \*